(12) United States Patent
Matsushita (10) Patent No.: US 7,118,266 B2
(45) Date of Patent: Oct. 10, 2006

(54) SURFACE LIGHT SOURCE DEVICE OF SIDE LIGHT TYPE

(75) Inventor: Hiromi Matsushita, Funabashi (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 10/816,926

(22) Filed: Apr. 5, 2004

(65) Prior Publication Data

US 2004/0190280 A1    Sep. 30, 2004

Related U.S. Application Data

(62) Division of application No. 10/179,975, filed on Jun. 26, 2002, now Pat. No. 6,742,906, which is a division of application No. 09/078,445, filed on May 14, 1998, now Pat. No. 6,435,685.

(30) Foreign Application Priority Data

May 17, 1997   (JP) .............................. 1997-143346

(51) Int. Cl.
*F21V 7/04* (2006.01)

(52) U.S. Cl. ...................................... 362/609; 362/608

(58) Field of Classification Search ................ 362/26, 362/27, 31, 608, 609; 349/65
See application file for complete search history.

(56) References Cited

U.S. PATENT DOCUMENTS

| 4,648,690 | A |  | 3/1987 | Ohe |
| 4,714,983 | A |  | 12/1987 | Lang |
| 5,688,035 | A |  | 11/1997 | Kashima et al. |
| 5,788,356 | A | * | 8/1998 | Watai et al. ................... 362/31 |
| 5,886,759 | A |  | 3/1999 | Mashino et al. |
| 6,053,619 | A |  | 4/2000 | Nakamura et al. |
| 6,074,070 | A |  | 6/2000 | Sasako |
| 6,435,685 | B1 | * | 8/2002 | Matsushita .................... 362/31 |
| 6,742,906 | B1 | * | 6/2004 | Matsushita .................... 362/31 |

* cited by examiner

*Primary Examiner*—Stephen F Husar
(74) *Attorney, Agent, or Firm*—Staas & Halsey LLP (57) ABSTRACT

A surface light source device of side light type has a guide plate, a primary light source for supplying illuminating light through an incidence surface, first and second edges at which major surfaces respectively intersect the incidence surface, and one or plural additive members arranged in direct contact with the emission surface and/or the back surface thereon in the vicinity of the first edge and/or the second edge. At least one of the additive members has a shield for preventing illuminating light from being incident to the first or second edge. For example, the shield includes absorptive areas formed on the additive members. Each of the absorptive areas is formed so that each of the absorptive areas crosses the first or second edge. A distal end of a reflector arranged in the primary light source or frame blocks incidence of light to the first and/or second edge. The light incidence block to each edge prevents luminance irregularities in the form of a bright line.

1 Claim, 6 Drawing Sheets

SURFACE LIGHT SOURCE DEVICE OF SIDE LIGHT TYPE

CROSS-REFERENCE TO RELATED APPLICATIONS

This application is a divisional application of patent application Ser. No. 10/179,975 filed Jun. 26, 2002 now U.S. Pat. No. 6,742,906, which is a divisional application of patent application Ser. No. 09/078,445 filed May 14, 1998, now U.S. Pat. No. 6,435,685.

BACKGROUND OF THE INVENTION

1. Field of the Invention

The present invention relates to a surface light source device of side light type, and more particularly to a technique for improving uniformity of output light in the surface light source device. The present invention is applied, for example, to backlighting for a liquid crystal display.

2. Description of the Related Art

A surface light source device of side light type is conventionally applied to a liquid crystal display to illuminate a liquid crystal panel from its back surface. The arrangement is suitable for making an entire shape of the surface light source device thin.

A bar-shaped light source such as a cold cathode tube, etc. is generally adopted as a primary light source in the surface light source device of side light type and is arranged on the side of a guide plate (a guide body formed in a plate shape). Illuminating light emitted from the primary light source is introduced into the guide plate through a side end surface of the guide plate. The introduced illuminating light is propagated within the guide plate and light is emitted from a major surface of the guide plate toward a liquid crystal panel during the propagation.

It is known that the guide plate adopted in such a surface light source device of side light type is of a type having a substantially uniform plate thickness and a type having a tendency in which a plate thickness is reduced as distance between the guide plate and the primary light source is increased. In general, the latter efficiently emits illuminating light in comparison with the former.

Figure 8:
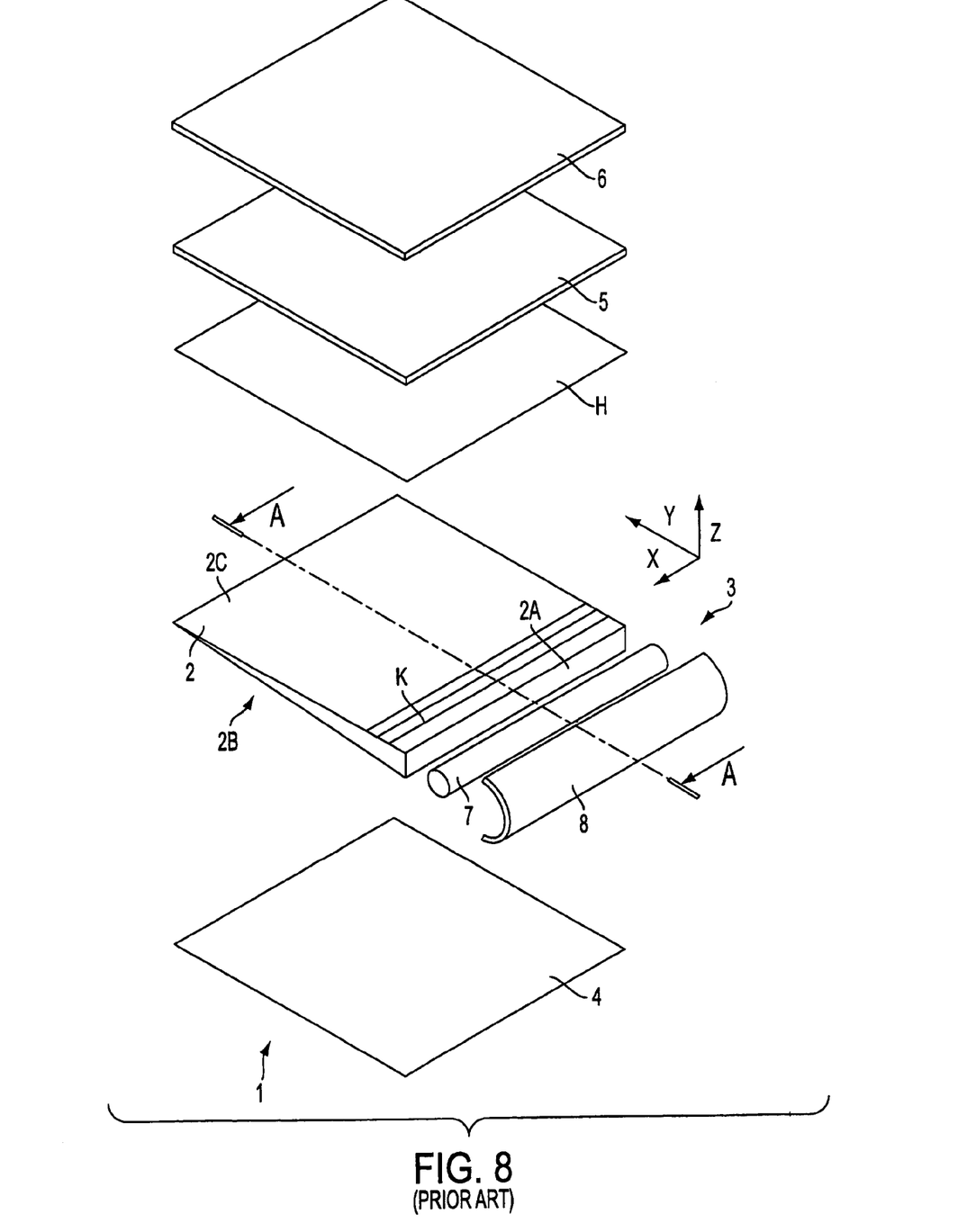
FIG. 8 is an exploded perspective view showing a conventional surface light source device of side light type.
Figure 9:
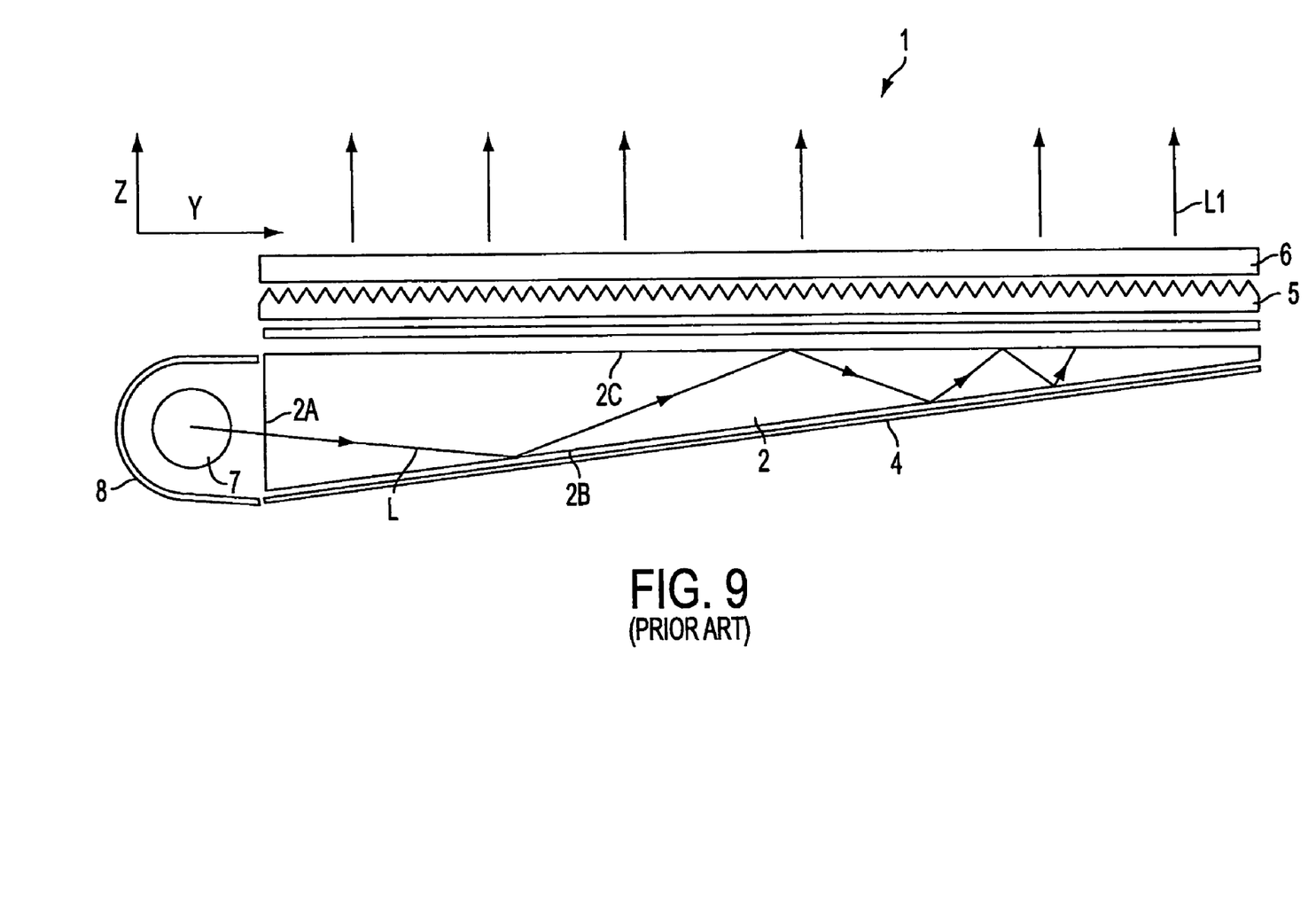
FIG. 9 is a cross-sectional view taken along line A—A of FIG. 8.

FIG. 8 is an exploded perspective view showing a surface light source device of side light type using the guide plate of the latter type. FIG. 9 shows a cross section taken along line A—A of FIG. 8. With reference to FIGS. 8 and 9, the surface light source device 1 of side light type has a guide plate 2, a primary light source 3, a reflection sheet 4, a light diffusive sheet H and prism sheets 5, 6 serving as light control members. The primary light source 3 is made of a light source element 7 and a reflector 8. The elements except for the guide plate 2 and the primary light source element 7 are also called "additive members". The additive members illustrated in FIGS. 8 and 9 are the refection sheet 4, the light diffusive sheet H, the prism sheets 5, 6 and the reflector 8.

The guide plate 2 is a transparent guide plate having a wedge-shaped cross section. For example, acrylic resin is adopted as a material of the guide plate 2. The guide plate 2 has two major surfaces 2B, 2C. One major surface 2C is employed to emit illuminating light and is called an emission. The other major surface 2B is called a back surface. For example, a light diffusive surface is formed on the back surface 2B by mat processing in a normal example.

The light source element 7 is, for example, a cold cathode tube (fluorescent lamp) and a reflector 8 having a nearly semicircular shape in cross section is arranged behind the light source element 7. Illuminating light is supplied to a side end surface 2A of the guide plate 2 through an opening of the reflector 8. A sheet-like regular reflection member made of a metallic foil, etc., or a sheet-like irregular reflection member made of a white PET film, etc. is adopted as the reflection sheet 4.

Illuminating light L from the primary light source 3 is introduced into the guide plate 2 through the incidence surface 2A and is then propagated toward a distal end of the guide plate 2 while the illuminating light is repeatedly reflected between the back surface 2B and the emission surface 2C. The reflection sheet 4 is arranged along the back surface 2B.

Incident angles of illuminating light to the emission surface 2C are reduced stepwise every reflection on the slope 2B. The reduction causes increase in light components having angle equal to or smaller than the critical angle with respect to the emission surface, and promotes light emission from the emission surface. Thus, deficiency of emission in an area far from the primary light source 3 is prevented.

Illuminating light emitted from the emission surface 2C has a property of scattering light since the illuminating light is further irregularly reflected on the back surface 2B having a light diffusive property, or the reflection sheet 4. However, a main propagating direction of illuminating light emitted from the guide plate 2 is inclined to a distal direction (a direction opposed to the primary light source 3) with respect to a frontal direction. Namely, the emitted light of the guide plate 2 has directivity. Such property of the guide plate is called directive emitting property.

The light diffusive sheet H is arranged to diffuse illuminating light emitted from the guide plate 2 and prevent a light diffusive surface of the back surface 2B from being visually recognized from above the emission surface 2C. Further, the light diffusive sheet H is arranged to prevent conspicuous glow and shade portions from appearing in the guide plate 2 lightened by illuminating light.

The prism sheets 5, 6 are arranged to correct emitting directivity of the guide plate 2. For example, the prism sheets 5, 6 are formed by a transmissive sheet material such as polycarbonate. In many cases, the prism sheets 5, 6 are arranged so that a prism surface of the prism sheet 5 is opposite with the guide plate 2 and a prism surface of the prism sheet 6 also is opposite with the guide plate 2.

Each of the prism surfaces has many projections having a triangular shape in cross section and extending in an approximately parallel direction. The inside prism sheet 5 is orientated so that its projections run in parallel with the incidence surface 2A. The outside prism sheet 6 is orientated so that its projections run in a direction approximately perpendicular to the incidence surface 2A.

Slopes of the projections correct the main emitting direction of the emitted light to a frontal direction of the emission surface 2C. A so-called double-sided prism sheet in which prism surfaces are formed on its both sides may be used.

In general, a surface light source devices of side light type adopting such a wedge-shaped guide plate and the prism sheets emit light in the frontal direction more efficiently than a surface light source device of side light type adopting a guide plate having a substantially uniform thickness.

However, an undesirable bright line appears on the guide plate 2 in the conventional device explained above so that uniformity of output light is reduced. As illustrated by reference sign K in FIG. 8, one to several bright lines are generated as a local thin high luminance band on the emission surface 2C near the incidence surface 2A. If a very high light diffusive property is given to the light diffusive sheet H, such bright lines are inconspicuous, but an entire reduction in luminance is caused.

SUMMARY OF THE INVENTION

An object of the present invention is to provide a surface light source device of side light type with improved uniformity of output light by preventing bright lines from being generated on a guide plate.

The present invention is applied to a surface light source device of side light type comprising a guide plate having major surfaces for providing an emission surface and a back surface, a primary light source for supplying illuminating light through an incidence surface of a side portion of the guide plate, first and second edges at which the major surfaces respectively intersect the incidence surface, and one or plural additive members arranged in direct contact with the emission surface and/or the back surface thereon in the vicinity of the first edge and/or the second edge.

In accordance with features of the present invention, at least one of the additive members has a shield for preventing illuminating light from being incident to the first or second edge.

The shield may include an absorptive area formed on the additive member(s) and each absorptive area may be formed so as to cross the first or second edge. The shield may be formed on an additive member arranged along the emission surface and/or the back surface.

Further, the additive member(s) include(s) a reflector arranged in the primary light source, and a distal end portion of the reflector may also provide a shield. In the case, a turn-up may be also formed in one or two distal end portions of the reflector so as to cross at least one of the first and second edges. A bend may be formed in one or two distal end portions of the reflector as locating just before the first or second edge. A J-curve portion may be formed in one or two distal end portions of the reflector as curving just before the first or second edge.

It is preferable that height of the reflector is greater than distance between the first and second edges in a position separated far from the emission surface, and is approximately equal to distance between the first and second edges in the vicinity of the incidence surface.

The additive member(s) include(s) a frame for surrounding the primary light source from its back, and a distal end portion of the frame may also provide a shield. A projecting portion may be projected inside and may form a slope in one or two distal end portions of the frame so as to block incidence of light to the first or second edge in order to provide a shield. It is preferable that height of the frame is greater than distance between the first and second edges in a position separated far from the emission surface, and is approximately equal to distance between the first and second edges in the vicinity of the incidence surface.

Blocking of light incidence to the edges prevents generation of luminance irregularities K (see FIG. 8 and related explanation) in the form of a bright line which would be generated in the prior art, even when the present invention is embodied in any one of the embodiments.

The present invention will next be described further in detail with reference to the accompanying drawings.

DETAILED DESCRIPTION OF THE PREFERRED EMBODIMENTS (1) First Embodiment

A first embodiment will next be explained with reference to FIGS. 1 and 2A–2B. In the figures and the explanation, elements employed commonly to the prior art (FIGS. 8 and 9) are designated by common reference numerals. Further, repeating of explanation is minimized in the following description.

Figure 1:
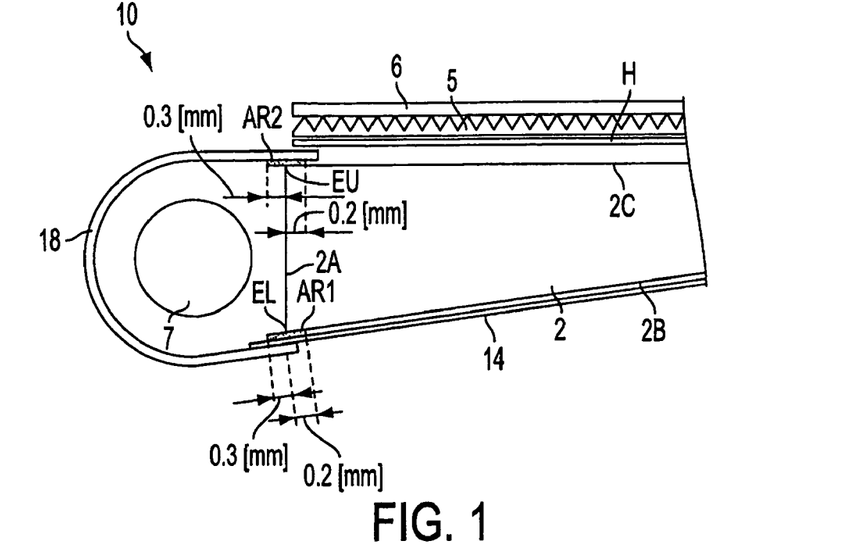
FIG. 1 is a cross-sectional view showing a surface light source device of side light type in accordance with a first embodiment of the present invention.
Figure 2A:
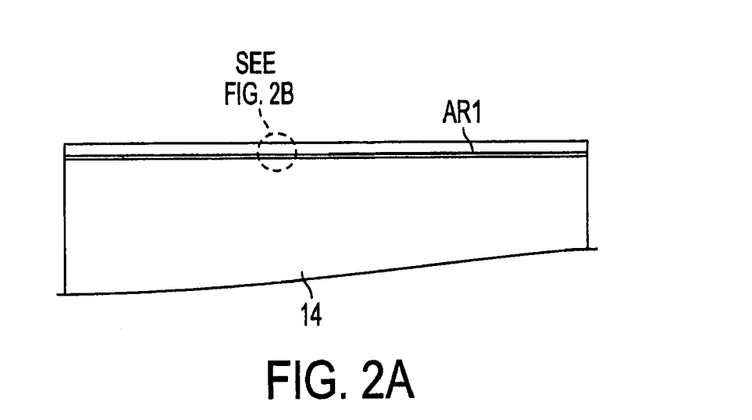
FIGS. 2A and 2B are plan views showing a reflection sheet adopted in the surface light source device of side light type in FIG. 1.
Figure 2B:
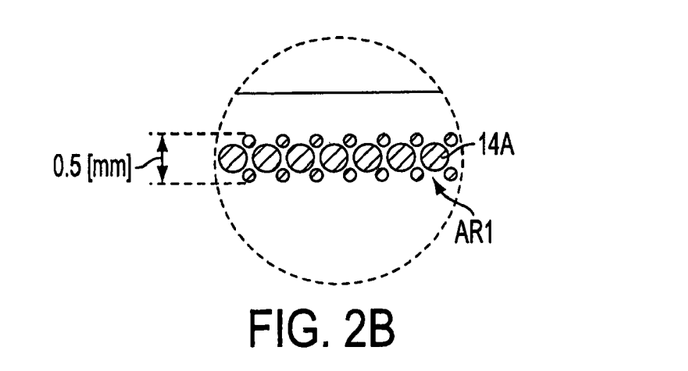

With reference to FIGS. 1 and 2A–2B, a surface light source device 10 of side light type has a guide plate 2, a primary light source 3 (a fluorescent lamp 7 and a reflector 18), a reflection sheet 14, a light diffusive sheet H and prism sheets 5, 6. The reflector 18, the reflection sheet 14, the light diffusive sheet H and the prism sheets 5, 6 are additive members. The guide plate 2 has a back surface 2B and an emission surface 2C as major surfaces.

A regular reflection member evaporating silver on a base sheet is adopted in the reflection sheet 14 to show high reflectivity with respect to illuminating light. The reflection sheet 14 efficiently returns illuminating light leaked from the back surface 2B of the guide plate 2 into the guide plate 2 so that loss of illuminating light is prevented.

The reflection sheet 14 is arranged so that a projecting end of the reflection sheet 14 is projected across a lower edge EL (extending on a crossing of the incidence surface 2A and the back surface 2B; the same hereafter) of the incidence surface 2A. The reflector 18 is arranged so as to nip a distal end portion of the reflection sheet 14 between one distal end portion of the reflector 18 and the back surface 2B while the other distal end portion of the reflector 18 is nipped between the light diffusive sheet H and the emission surface 2C.

A distal end portion of the reflection sheet 14 is formed so that an absorptive area AR1 in a line shape crosses the lower edge EL. As shown in FIGS. 2A–2B, for example, the absorptive area ARI is formed so as to have 0.5 mm width. When the absorptive area AR1 is positioned without any error with respect to the guide plate 2, an area portion of the absorptive area AR1 having 0.2 mm width among 0.5 mm of entire width contacts with the back surface 2B and the remaining area portion (0.3 mm) thereof exceeds the edge EL as shown in FIG. 1.

The absorptive area AR1 may be formed by printing with ink having a light absorptive property. In the embodiment, a dot pattern of black ink 14A is applied onto the reflection sheet 14. The dot pattern is formed so that ink application amount per unit area is gradually reduced as being far from a portion just below the edge EL. Thus, absorptive power is gradually reduced as being far from the portion just below the edge EL. Accordingly, a sharp change in absorptive power is avoided. As a result, the area AR1 itself is prevented from being conspicuous when the area is observed from above the emission surface 2C.

The area AR1 restrains illuminating light from being incident to the edge EL through reflection on the reflection sheet 14 so that undesirable lightening of the edge EL is prevented. Since the lightening of the edge EL is one of factors of a bright line K (see FIG. 1), the area AR1 is useful to prevent the bright line.

Here, it should be noted that the reflection sheet 14 forming the absorptive area AR1 thereon is an additive member directly contacting with the guide plate 2 (back surface 2B). Accordingly, the edge EL is prevented from being lightened by illuminating light propagated through a base material of the additive member (reflection sheet 14).

Lightening is also prevented with respect to an upper edge EU (extending on a crossing of the incidence surface 2A and the emission surface 2C; the same, hereafter) of the incidence surface 2A. The reflector 18 is made of a sheet material evaporation-deposited with silver thereon, but has an absorptive area AR2 in a line shape near a distal end portion of the reflector 18 nipped between the light diffusive sheet H and the emission surface 2C.

The absorptive area AR2 is formed so as to cross the upper edge EU. Similar to the absorptive area AR1, for example, the absorptive area AR2 is formed so as to have has 0.5 mm width. When the absorptive area AR2 is positioned without any error with respect to the guide plate 2, as shown in FIG. 1, an area portion of 0.2 mm in width of 0.5 mm of entire width comes in contact with the emission surface 2B and the remaining area portion (0.3 mm) is projected outside the edge EU.

The absorptive area AR2 may be formed in a technique similar to that of the absorptive area AR1. For example, a dot pattern of black ink is applied onto the reflector 18. The dot pattern is formed so that ink application amount per unit area is gradually reduced as being far from a portion just above the edge EU. Thus, absorptive power is gradually reduced as being far from the portion just above the edge EU. Accordingly, a sharp change in absorptive power is avoided. As a result, conspicuousness of the area AR2 itself is prevented when the area AR2 is observed from above the emission surface 2C.

The area AR2 restrains illuminating light from being incident to the edge EU through reflection on the reflector 18 so that undesirable lightening of the edge EU is prevented. The lightening of the edge EU is one of factors of the bright line K (see FIG. 1) together with the lightening of the edge EL. Accordingly, the area AR2 is useful to prevent the bright line.

Here, it should be noted that the reflector 18 forming the absorptive area AR2 thereon is an additive member arranged so that the additive member comes in direct contact with the guide plate 2 (emission surface 2C). Accordingly, the edge EU is prevented from being lightened by illuminating light propagated through a base material of the additive member (reflector 18).

Illuminating light generated in the fluorescent lamp 7 is directly transmitted or reflected on the reflector 18, and is then introduced into the guide plate 2 through the incidence surface 2A. While illuminating light is scattered on the light diffusive surface on the back surface 2B, illuminating light is repeatedly reflected between the back surface 2B and the emission surface 2C and is entirely propagated toward a distal end of the guide plate 2.

In the process, an internal incident angle of illuminating light to the emission surface 2C is reduced as illuminating light approaches the distal end of the guide plate 2. Light components having angles equal to or smaller than the critical angle with respect to the emission surface 2C are emitted from the emission surface 2C. Illuminating light leaked from the back surface 2B is efficiently returned into the guide plate 2 by the reflection sheet 14 so that loss of illuminating light is prevented.

One portion of illuminating light emitted from the emission surface 2C, though a small quantity, can approach the upper and lower edges EU, EL of the incidence surface 2A through various paths (for example, repetitious reflection between the light diffusive sheet H and the emission surface 2C). However, the actual incidence of illuminating light to the upper and lower edges EU, EL is almost blocked by absorptive power of the absorptive areas AR1, AR2.

Finally, illuminating light is almost prevented from actually reaching the edges EL, EU even when illuminating light approaches the edges EL, EU from any one of left-hand and right-hand sides with respect to the incidence surface 2A in FIG. 1 in the absorptive areas AR1, AR2. As a result, the factors of bright line appearance are effectively removed.

(2) Second Embodiment

A second embodiment will next be explained with reference to FIG. 3. The embodiment has a structure common to the first embodiment except for around an upper side of the incident surface of the guide plate. Accordingly, elements employed commonly to the first embodiment (FIGS. 1 and 2A–2B) are designated by common reference numerals in the following illustration and explanation. Further, an overlapping explanation is minimized in the following description.

Figure 3:
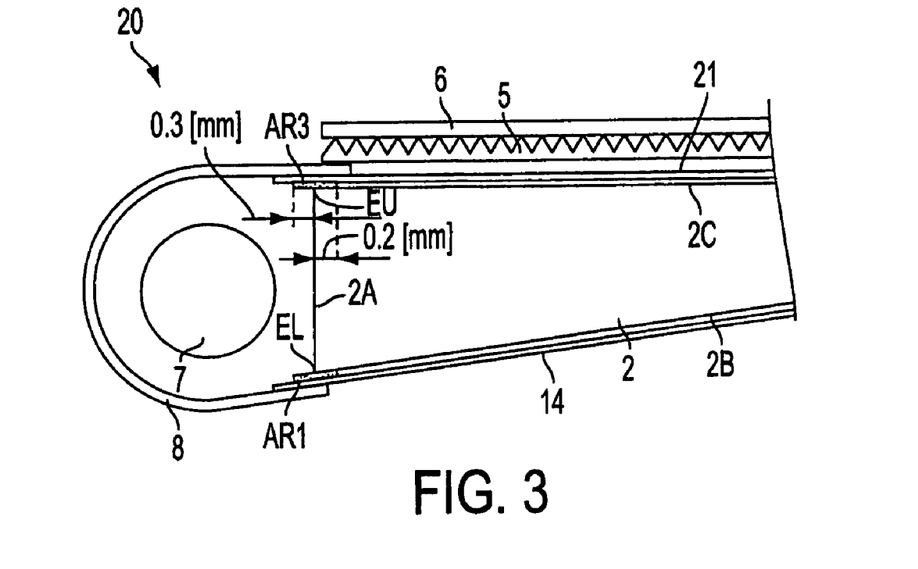
FIG. 3 is a cross-sectional view showing a surface light source device of side light type in accordance with a second embodiment of the present invention.

With reference to FIG. 3, a surface light source device 20 of side light type has a guide plate 2, a primary light source 3 (a fluorescent lamp 7 and a reflector 8), a reflection sheet 14, a light diffusive sheet 21 and prism sheets 5, 6. The reflector 8, the reflection sheet 14, the light diffusive sheet 21 and the prism sheets 5, 6 are additive members. The guide plate 2 has a back surface 2B and an emission surface 2C as major surfaces.

A regular reflection member evaporating silver on a base sheet is adopted in the reflection sheet 14 so as to show high reflectivity with respect to illuminating light. The reflection sheet 14 efficiently returns illuminating light leaked from the back surface 2B of the guide plate 2 into the guide plate 2 so that loss of illuminating light is prevented.

The reflection sheet 14 is arranged so that a projecting end thereof is projected across a lower edge EL of the incidence surface 2A (a intersection of the incidence surface 2A and the back surface 2B). The reflector 8 is arranged so that a distal end portion of the reflection sheet 14 is sandwiched between one projecting end of the reflector 8 and the back surface 2B while the other distal end portion of the reflector 8 is held between the light diffusive sheet 21 and the emission surface 2C.

An absorptive area AR1 in a line shape is formed near the distal end portion of the reflection sheet 14 so as to cross the lower edge EL. For example, the absorptive area AR1 is formed so that the absorptive area AR1 has 0.5 mm width.

When the absorptive area AR1 is positioned without any error with respect to the guide plate 2, an area portion having 0.2 mm in the entire width of 0.5 mm contacts the back surface 2B and the remaining area portion (0.3 mm) exceeds the edge EL as shown in FIG. 1.

The absorptive area AR1 may be formed by printing ink having a light absorptive property. Similar to the case of the first embodiment, a dot pattern of black ink is applied onto the reflection sheet 14. The dot pattern is formed so that ink application amount per unit area is gradually reduced as being far from a portion just below the edge EL. Thus, absorptive power is gradually reduced as being far from the portion just below the edge EL. Accordingly, a sharp change in absorptive power is avoided. As a result, the area AR1 itself is prevented from being conspicuous when the area is observed from above the emission surface 2C.

The area AR1 restrains illuminating light from being incident to the edge EL through reflection on the reflection sheet 14 so that undesirable lightening of the edge EL is prevented. Since the lightening of the edge EL is one of factors of the bright line K (see FIG. 1), the area ARI is useful to prevent the bright line. The reflection sheet 14 on which the absorptive area AR1 is formed is arranged so as to directly contact the guide plate 2 (back surface 2B). Thus, the edge EL is prevented from being lightened by illuminating light propagated through a base material of the additive member (reflection sheet 14).

Lightening is also prevented by a structure similar to that in the first embodiment with respect to an upper edge EU of the incidence surface 2A (a intersection of the incidence surface 2A and the emission surface 2C). In the embodiment, an absorptive area AR3 is formed on an inside face of the light diffusive sheet 21 instead of the reflector 8. A distal end portion of the light diffusive sheet 21 is nipped between a distal end portion of on the reflector 8 and the emission surface 2C.

The absorptive area AR3 is formed cross the upper edge EU. Similar to the absorptive area AR1, for example, the absorptive area AR3 is formed so as to have 0.5 mm in width. When the absorptive area AR3 is positioned without any error with respect to the guide plate 2, as shown in FIG. 3, an area portion having 0.2 mm in the entire width of 0.5 mm comes in contact with the emission surface 2B and the remaining area portion (0.3 mm) is projected outside the edge EU.

The absorptive area AR3 may be formed in a technique similar to that of the absorptive area AR1. For example, a dot pattern of black ink is applied onto the light diffusive sheet 21. The dot pattern is formed so that ink application amount per unit area is gradually reduced as being far from a portion just above the edge EU. Thus, absorptive power is gradually reduced as being far from the portion just above the edge EU. Accordingly, a sharp change in absorptive power is avoided. As a result, conspicuousness of the area AR3 itself is prevented when the area AR3 is observed from above the emission surface 2C.

The area AR3 restrains illuminating light from being incident to the edge EU through reflection on the reflector 8 so that undesirable lightening of the edge EU is prevented. The lightening of the edge EU is one of factors of the bright line K (see FIG. 1) together with the lightening of the edge EL. Accordingly, the area AR3 is useful to prevent the bright line. Here, similar to the case of the reflector 18 (the first embodiment; FIG. 1), it should be noted that the light diffusive sheet 21 on which the absorptive area AR3 is formed is an additive member directly contacting with the guide plate 2 (the emission surface 2C). Thus, the edge EU is prevented from being lightened by illuminating light propagated through a base material of the additive member (the light diffusive sheet 21).

Illuminating light generated in the fluorescent lamp 7 is directly transmitted or reflected on the reflector 8, and is then introduced into the guide plate 2 through the incidence surface 2A. While illuminating light is scattered on the light diffusive surface on the back surface 2B, illuminating light is repeatedly reflected between the back surface 2B and the emission surface 2C and is entirely propagated toward a distal end of the guide plate 2.

In the process, an internal incident angle of illuminating light to the emission surface 2C is reduced as illuminating light approaches the distal end of the guide plate 2. Light components having angle equal to or smaller than the critical angle with respect to the emission surface 2C are emitted from the emission surface 2C. Illuminating light leaked from the back surface 2B is efficiently returned into the guide plate 2 by the reflection sheet 14 so that loss of illuminating light is prevented.

Some of illuminating light emitted from the emission surface 2C, though a small quantity, can approach the upper and lower edges EU, EL of the incidence surface 2A through various paths (for example, repetitious reflection between the light diffusive sheet 21 and the emission surface 2C). However, the actual incidence of illuminating light to the upper and lower edges EU, EL is almost blocked by absorptive power in the absorptive areas AR1, AR3.

Finally, similar to the first embodiment, illuminating light is almost prevented from actually reaching the edges EL, EU even when illuminating light approaches the edges EL, EU from any one of left-hand and right-hand sides with respect to the incidence surface 2A in FIG. 3 in the absorptive areas AR1, AR3. As a result, the generating factors of the bright line are effectively removed.

(3) Third Embodiment

A third embodiment will next be explained with reference to FIG. 4. The embodiment has a structure common to the first and second embodiments except for the upper and lower sides of the incident surface of the guide plate. Accordingly, elements employed commonly to the first embodiment (FIGS. 1 and 2A–2B) or the second embodiment (FIG. 3) are designated by common reference numerals in the following illustration and explanation. Further, an overlapping explanation is minimized in the following description.

Figure 4:
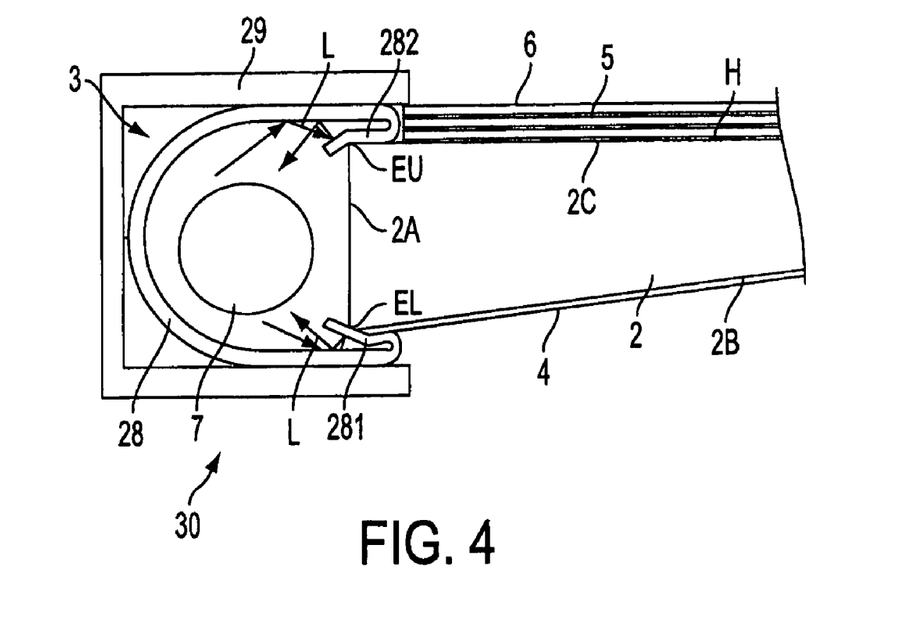
FIG. 4 is a cross-sectional view showing a surface light source device of side light type in accordance with a third embodiment of the present invention.

With reference to FIG. 4, a surface light source device 30 of side light type has a guide plate 2, a primary light source 3 (a fluorescent lamp 7 and a reflector 28), a reflection sheet 4, a light diffusive sheet H, prism sheets 5, 6 and a frame 29. The reflector 28, the reflection sheet 4, the light diffusive sheet H, the prism sheets 5, 6 and the frame 29 are additive members. The guide plate 2 has a back surface 2B and an emission surface 2C as major surfaces.

A regular reflection member depositing silver on a base sheet is adopted in the reflection sheet 4 so as to show high reflectivity with respect to illuminating light. The reflection sheet 4 efficiently returns illuminating light leaked from the back surface 2B of the guide plate 2 into the guide plate 2 so that loss of illuminating light is prevented.

The embodiment is characterized by both distal end portions of the reflector 28 and a structure around the reflector 28. The reflector 28 is made of a sheet material evaporation-deposited with silver thereon and is arranged so that the deposited silver surface is facing to the fluorescent lamp 7. Both the distal end portions of the reflector 28 have turn-ups 281, 282.

The turn-up 281 holds a distal end portion of the reflection sheet 4 between itself and the back surface 2B near a lower edge EL of an incidence surface 2A. In contrast, the turn-up 182 directly contacts with the emission surface 2C near an upper edge EU of the incidence surface 2A. The light diffusive sheet H and the prism sheets 5, 6 are arranged so that projecting ends thereof are located before the edge EU. Projecting ends of the turn-ups 281, 282 are respectively projected from the edges EL, EU to the fluorescent lamp 7.

As shown by an arrow L, light approaching the edges EL, EU is blocked by inner surfaces (reflection surfaces) of the turn-ups 281, 282 before the light reaches the upper and lower edges EU, EL. Accordingly, lightening of the edges EU, EL is avoided so that generation of the bright line K (see FIG. 1) is prevented. Light reflected on the inner surfaces of the turn-ups 281, 282 has a chance to be introduced into the guide plate 2 through the incidence surface 2A. The improves light utilization efficiency.

Projecting lengths of the turn-ups 281, 282 from the edges EL, EU are set to 1 mm in design. Such design reliably prevents lightening of the edges EU, EL even when sizes of elements are dispersed by manufacturing errors. Such projecting hardly shield illuminating light to be transmitted toward the incidence surface 2A of the guide plate 2 so that no luminance is reduced and no luminance irregularities are caused.

Both distal end portions of the frame 29 are utilized to reliably press the turn-ups 281, 282 onto the edges EL, EU against resilience. The frame 29 also functions as a pressing member for the light diffusive sheet H and the prism sheets 5, 6. The gap between the frame 29 and the edge EL or EU is reliably blocked by the resilience of the turn-ups 281, 282 so that leakage of light from the gap is prevented.

(4) Fourth Embodiment

A fourth embodiment will next be explained with reference to FIGS. 5A–5C. The embodiment has a structure common to the conventional structure (FIGS. 8 and 9) except for around upper and lower sides of the incident surface of the guide plate. Accordingly, elements employed commonly to the conventional structure (FIGS. 8 and 9) are designated by common reference numerals in the following illustration and explanation. Further, an overlapping explanation is minimized in the following description.

Figure 5A:
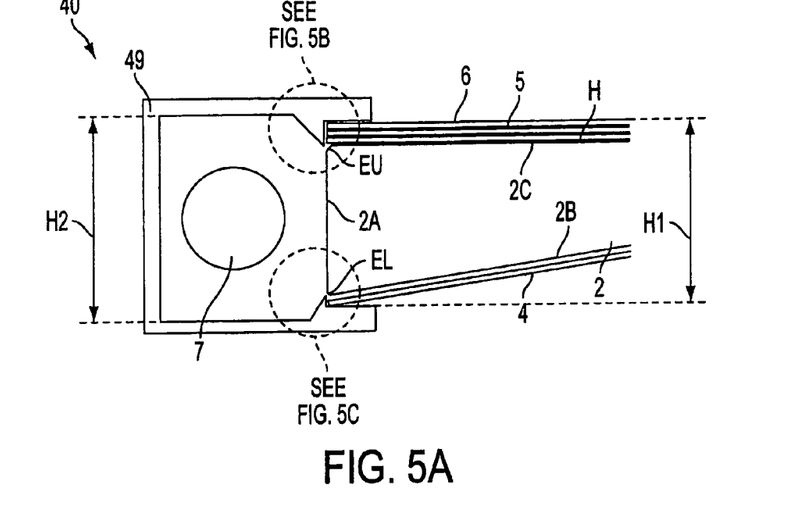
FIGS. 5A–5C are cross-sectional views showing a surface light source device of side light type in accordance with a fourth embodiment of the present invention.
Figure 5B:
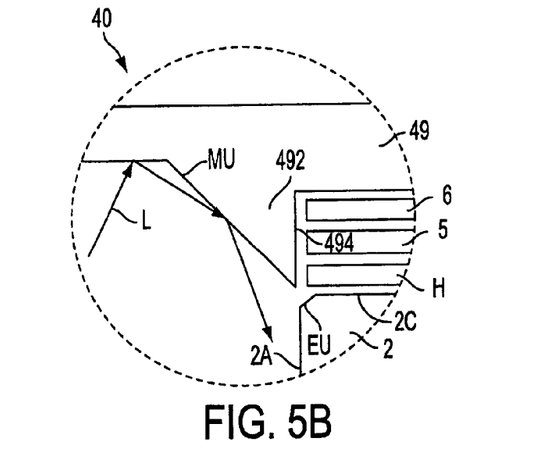
Figure 5C:
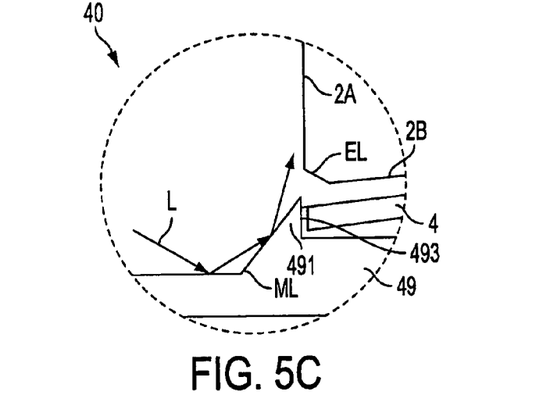

With reference to FIGS. 5A–5C, a surface light source device 40 of side light type has a guide plate 2, a fluorescent lamp 7, a reflection sheet 4, a light diffusive sheet H, prism sheets 5, 6 and a frame 49. The reflection sheet 4, the light diffusive sheet H, the prism sheets 5, 6 and the frame 49 are additive members. The guide plate 2 has a back surface 2B and an emission surface 2C as major surfaces. The frame 49 also functions as a reflector of the fluorescent lamp 7 and both of the members provide a primary light source.

A regular reflection member evaporating silver on a base sheet is adopted in the reflection sheet 4 so as to show high reflectivity with respect to illuminating light. The reflection sheet 4 efficiently returns illuminating light leaked from the back surface 2B of the guide plate 2 into the guide plate 2 so that loss of illuminating light is prevented.

The embodiment is characterized by the frame 49, particularly, a structure of a distal end portion of the frame 49. The frame 49 functions as means for preventing lightening of upper and lower edges EU, EL. The frame 49 is formed in a U-shape in cross section and is manufactured by injection molding of white resin. The fluorescent lamp 7 is housed in an inside space of the frame 49 and electrode portions of the lamp 7 at both ends thereof are held by unillustrated holders.

The frame 49 nips and supports, at its both distal end portions, the reflection sheet 4, the guide plate 2, the light diffusive sheet H and the prism sheets 5, 6. The frame 49 has inward projecting portions 491, 492 in both the distal end portions thereof and slopes ML, MU are formed in the projecting portions 491, 492.

Projecting ends of the projecting portions 491, 492 are located approximately just near the edges EU and EL to avoid reducing an effective area by shielding an incidence surface 2A. The frame 49 is reduced from H2 to H1 (H2>H1) in space in the vicinity of the incidence surface 2A.

Namely, the slope ML extends from a position just near the edge EL so as to separate from a virtual plane having the back surface 2B thereon toward an outer side. Similarly, the slope MU extends from a position just near the edge EU to separate from a virtual plane having the emission surface 2C thereon toward an outer side. All inside surfaces including the slopes ML, MU of the frame 49 provide a reflection surface.

Accordingly, as shown by reference sign L, illuminating light is reflected on the slopes ML, MU even when the illuminating light approaches the edges EL, EU. Therefore, illuminating light is almost prevented from actually reaching the edges EL, EU. As a result, undesirable lightening of the edges EL, EU is avoided so that generation of the bright line K (see FIG. 1) is prevented. Light reflected on the slopes ML, MU again has a chance to be incident into the guide plate 2 through the incidence surface 2A. The improves light utilization efficiency.

Here, it should be noted that illuminating light is well guided toward portions near the edges EL, EU of the incidence surface 2A since the inside surfaces of the frame 49 extends toward the edges EL, EU. Namely, illuminating light is incident to portions near the edges EL, EU in a wide range in a vertical direction in comparison with the conventional case.

The action avoids the occasion when the light amount becomes deficient to such a serious extent that a dark band is caused even if some portion of the incidence surface 2A is covered with distal end portions of the projecting portions 491, 492 by an error in manufacture or assembly. The dark band would be observed from above the emission surface 2C when amount of light introduced from the incidence surface 2A is greatly deficient in the vicinity of the edges EL, EU.

The embodiment also has an advantage that the surface light source device is easily assembled. Namely, with respect to the frame 49, the reflection sheet 4, the light diffusive sheet H and the prism sheets 5, 6 are easily positioned by vertical surfaces 493, 494 of the projecting portions. As a result, it can be expected that an assembly work is simplified.

(5) Other Embodiments

The present invention is not limited to the first to fourth embodiments explained above. For example, the present invention can be modified as follows.

(a) In the first and second embodiments, the reflector 18 is formed on the emission surface 2C and the absorptive areas AR2, AR3 are formed on the light diffusive sheet 21. However, the present invention is not limited to the case. The absorptive areas may be formed on another additive member directly arranged on the emission surface. For example, when a prism sheet is directly arranged on the emission surface, an absorptive area may be formed on the prism sheet (a distal end portion near an upper edge).

(b) In the first and second embodiments, the absorptive area AR1 is formed in the reflection sheet 14. However, the present invention is not limited to the case. The absorptive area may be formed in another additive member directly contacting with the back surface. For example, when the reflector arranged in addition to the primary light source extends onto the back surface and contacts with the back surface, the absorptive area may be formed on the reflector (a distal end portion near a lower edge).

(c) The sizes of the absorptive areas AR1, AR2, AR3 shown in the first and second embodiments are mere examples. Widths of the absorptive areas AR1 to AR3 may be selectively designed. In accordance with an experiment, the edges EL, EU can be shielded when the widths of the absorptive areas AR1 to AR3 are equal to or smaller than 1.5 mm.

(d) The absorptive areas AR1 to AR3 may be formed by other techniques. For example, printing of ink of a dark color such as gray, etc. may be adopted. Further, a mode other than dot patterns may be adopted in the absorptive areas AR1 to AR3. For example, the absorptive areas AR1, AR2, AR3 may be formed by ink printing of a line group pattern.

(e) In the first and second embodiments, reflection surfaces of additive elements (for example, a silver with evaporation-deposited-deposited surface) are arranged so that each reflection surface is directed to the guide plate. Further, the additive elements (the reflection sheet, the reflector, the light diffusive sheet, etc.) are arranged so that the absorptive areas AR1, AR2, AR3 come in direct contact with the guide plate. However, the present invention is not limited to the case.

The surface of a base material instead of the reflection surface may be arranged in a case so that the base material surface is directed to the guide plate. Further, additive elements may be arranged so that the absorptive areas AR1 to AR3 turn their backs on the guide plate.

Figure 6:
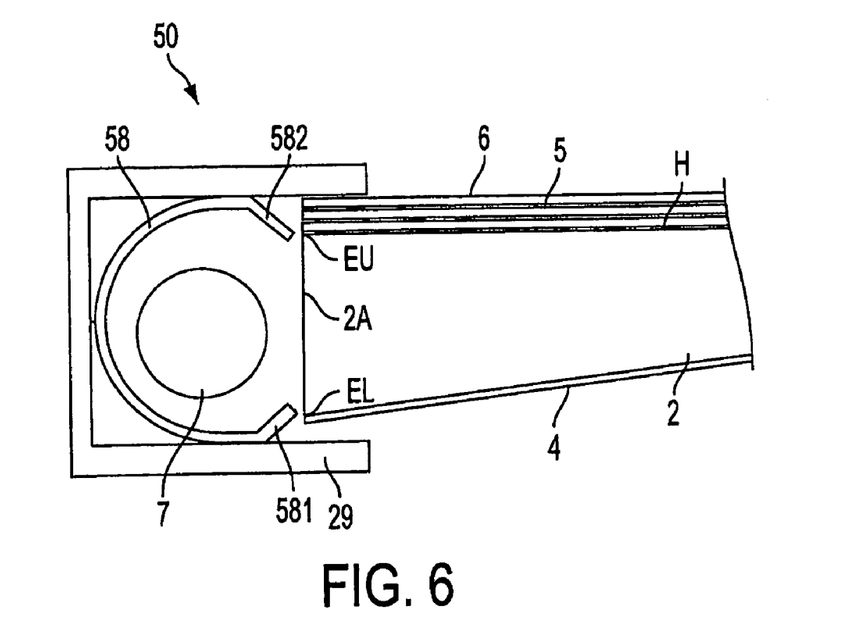
FIG. 6 is a cross-sectional view showing a surface light source device of side light type in a modified example of the third embodiment of the present invention.
Figure 7:
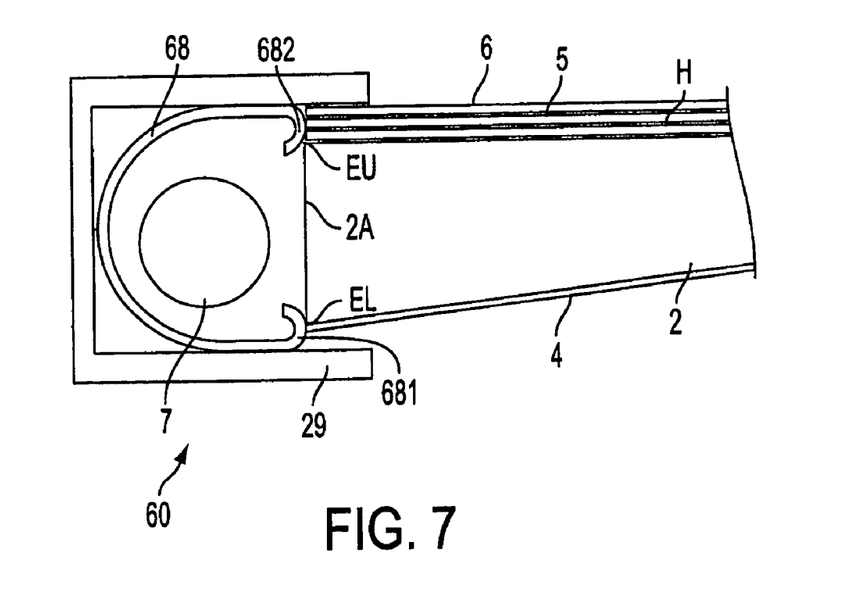
FIG. 7 is a cross-sectional view showing a surface light source device of side light type in another modified example of the third embodiment of the present invention.

(f) In the third embodiment, the reflector is arranged so that one portion of a turn-up overlaps the emission surface and the back surface. However, the present invention is not limited to the case. FIGS. 6 and 7 show two modified examples of the third embodiment.

With reference to FIG. 6, a distal end portion of a reflector 58 is inward bent just before an incidence surface 2A, thereby forming bends 581, 582. The bends 581, 582 block the incidence of illuminating light to edges EL, EU. Height of the reflector 58 is greater than distance between the edges EL and EU. Accordingly, actions similar to those of the slopes MU, ML in the fourth embodiment are obtained.

With reference to FIG. 7, J-curve portions 681, 682 are formed by inward bending a distal end portion of a reflector 68 just before an incidence surface 2A. The J-curve portions 681, 682 block the incidence of illuminating light to edges EL, EU. Height of the reflector 68 is greater than distance between the edges EL and EU. Accordingly, actions similar to those of the slopes MU, ML in the fourth embodiment are obtained.

(g) In the fourth embodiment, the slopes MU, ML of the frame entirely have a reflective property. However, the present invention is not limited to the case. For example, an absorptive area may be formed on the slopes.

(h) In the fourth embodiment, the slopes ML, MU of the frame are entirely flat surfaces. However, the present invention is not limited to the case. For example, the slopes ML, MU may be also formed as curved surfaces.

(i) In the fourth embodiment, reflector arrangement behind the fluorescent lamp is omitted. However, the present invention is not limited to the case. For example, a reflector may be also arranged inside the frame.

(j) The above various kinds of edge shields (the absorptive area, the turn-up of the reflector, the slopes of the frame, the bend of the reflector and the J-curve portion of the reflector) may be employed in combination with each other. Different kinds of shields may be also applied to the upper edge EU and the lower edge EL. Further, the shields may be also applied to one of the upper and lower edges in a certain case.

(k) A regular reflection member of an arbitrary material or an irregular reflection member of white PET, etc. may be adopted in the reflection member (the reflector and the reflection sheet).

(l) In the above embodiments, the light diffusive sheet is arranged along the emission surface. However, the light diffusive sheet may be omitted. Another additive member such as the prism sheet, etc. may be directly arranged on the emission surface, and the light diffusive sheet may be arranged outside the additive member. Further, the light diffusive sheet may be also integrated with the prism sheet.

(m) There are no limits in form and orientation of prism sheet and number of prism sheets in the present invention. For example, only one single-sided prism sheet may be arranged. The prism sheet may be arranged so that a prism surface is opposed to the emission surface of the guide plate. A so-called double-sided prism sheet having prism surfaces on both sides thereof may be adopted. Further, the prism surface may be also formed on a major surface (the emission surface and/or the back surface) of the guide plate.

(n) In the above embodiments, a transparent guide plate is adopted as the guide plate. However, a scattering guide plate may be adopted instead of the transparent guide plate. The scattering guide plate is a guide plate having scattering power therein. For example, the scattering guide plate is a guide plate in which scattering fine grains are dispersed.

(o) A cross-sectional shape of the guide plate may be not set to a wedge shape. For example, a guide plate having a uniform thickness may be adopted.

(p) The incidence surface of the guide plate may be set to two end surfaces or more, and plural primary light sources may be correspondingly arranged.

(q) The primary light source may have a light source element other than a bar-shaped light source such as a fluorescent lamp. For example, the primary light source may be also formed by arranging plural point light sources of a light emitting diode, etc.

(r) Surface light source device of side light type in the present invention may be also applied to uses other than backlighting for a liquid crystal display. For example, the surface light source devices of side light type in the present invention can be widely applied to various kinds of illuminating devices and displays.

What is claimed is:

1. A surface light source device of side light type, comprising:
    a guide plate having major surfaces to provide an emission surface and a back surface;
    a primary light source to supply illumination light through an incidence surface of a side portion of said guide plate, said guide plate providing first and second edges at which the major surfaces respectively intercept the incidence surface; and
    a frame surrounding said primary light source, at least one distal end portion of said frame member providing a shield forming a projected slope inclined so as to reflect and guide illuminating light toward an incidence surface area remote from the first and second edges, wherein height of said frame is greater than a distance between the first and second edges in a position separated far from the incidence surface, and is approximately equal to a distance between the first and second edges in the vicinity of the incidence surface.

* * * * *